J. A. RONCHETTI.
TYPE WRITING MACHINE.
APPLICATION FILED MAY 9, 1908.

1,163,955.

Patented Dec. 14, 1915.
4 SHEETS—SHEET 2.

UNITED STATES PATENT OFFICE.

JOSEPH A. RONCHETTI, OF WOONSOCKET, RHODE ISLAND, ASSIGNOR, BY MESNE ASSIGNMENTS, TO THE NOISELESS TYPEWRITER COMPANY, OF MIDDLETOWN, CONNECTICUT, A CORPORATION OF CONNECTICUT.

TYPE-WRITING MACHINE.

1,163,955.  Specification of Letters Patent.  Patented Dec. 14, 1915.

Application filed May 9, 1908. Serial No. 431,856.

*To all whom it may concern:*

Be it known that I, JOSEPH A. RONCHETTI, a subject of the King of Italy, residing at Woonsocket, in the county of Providence and State of Rhode Island, have invented certain new and useful Improvements in Type-Writing Machines, of which the following is a full, clear, and exact description, such as will enable others skilled in the art to which it appertains to make and use the same.

This invention relates broadly to typewriting machines, and more particularly to a machine of a type which is designed to effect writing without producing noise.

In typewriting machines as hitherto constructed a large part of the noise produced during the operation thereof has been produced by clicking parts of the escapement mechanism and one of the objects of my invention is to overcome this objection and to render the operation of the escapement mechanism of the typewriting machine substantially noiseless.

Another object of the invention is to provide improved means for actuating the vibratory dog-carrier whereby the feed of the carriage is quickened.

Another object is to provide improved means for arresting the vibratory movements of the dog carrier, and also to provide improved means for effecting adjustment of the various parts of the escapement mechanism of a typewriting machine.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings, wherein is illustrated several of various possible embodiments of my invention, Figs. 8, 9 and 10 respectively, show the parts illustrated in Figs. 5, 6 and 7, but in a different position, the vibratory rocker member having been rocked sidewise as when the universal-bar has been depressed and the loose dog having thereby been disengaged from the escapement wheel. Figs. 11, 12 and 13 show the parts of Figs. 5, 6 and 7, the loose or escapement dog having been moved away from the fixed or detaining dog by a reverse rotation of the escapement wheel as when the carriage has been back spaced.

Similar reference characters refer to similar parts throughout the several views of the drawings.

Referring now to the drawings, and particularly to the embodiment illustrated in Figs. 1 to 12 inclusive, 1 represents a portion of the frame of the machine which supports, by means of lugs 2, pivot screws 3 upon which oscillates the vibratory rocker member 4. This rocker member carries the fixed or detaining dog 5 and a loosely mounted or floating feed-dog 6, the former of which, at its rear portion, is attached to the rocker member by means of a pivot screw 7, said dog near its opposite end being provided with an aperture 8 which receives a flanged eccentric bushing 10 through which extends a clamp screw 11, the flange 12 of the bushing being formed in the present instance hexagonal, so that it may be readily rotated, the rotation thereof operating to adjust the position of dog 5 upon the rocker member, where it may be held in position after adjustment by means of the clamp screw 11 and the pivot screw 7.

The vibratory rocker member 4 is provided with a pair of fixed abutments which are constituted by posts 13 and 14 upon which may be mounted, if desired, rollers or bushings, at 15 and 16 respectively. The feed-dog 6 is located between posts 13 and 14 as clearly shown in Figs. 5, 8 and 11 of the drawings, and is held or confined between said posts by means of a cap or anchor member 17, which is secured upon the rocker member by means of post 14, the head 18 of which clamps it against bushing 16, the construction of the parts being such that the cap may be adjusted, for a purpose which will be hereinafter understood.

The feed dog 6 is provided near its forward end with a cam surface 19 which engages with the post 13 or roller 15 located thereon, and said dog near its rear end is provided with a curved cam surface 20 which engages with the bushing 16, mounted upon post 14. The cam surface 19 is struck upon an arc of larger radius than that of the roller 15 with which it engages, and the curved cam surface 20 is also preferably struck upon an arc of larger radius than that of the bushing 16, although, if desired, the curved surface 20 may be omitted as will hereinafter appear.

Between the end 21 of the feed dog and a tail piece 22 of cap 17 is extended a retractile spring 23. This spring holds the curved surface 20 of the feed-dog against the post or bushing 16 in whatever position the dog assumes, and likewise maintains the cam surface 19 of the dog in constant engagement with the roller 15, as will readily be understood. The relation of the cam surfaces 19 and 20 of the feed-dog to posts 13 and 14, constituting what may be termed roller cam means, is such that when the dog is released from the escapement wheel the spring 23 pulls the dog inwardly until the same is arrested and held in the position shown in Figs. 8, 9 and 10 of the drawings, in which position said dog will be in position to engage with another tooth of the escapement wheel, the fixed or detaining dog 5 holding the escapement wheel against rotation as will be understood. The pull or stress exerted by the spring 23 against the loose dog and the direction of the exertion thereof may be readily changed by an adjustment of cap or plate 17.

The dogs 5 and 6 coöperate to space a circular rack or escapement wheel 24 which may be operatively connected with the carriage of the type-writing machine in any approved manner, as by means of the usual feed pinion, as will be understood, these latter parts not being shown herein.

The rocker member 4 is provided with an arm 25 which carries by means of the stud screw 26 a flanged collar or wheel 27. This collar, which may be mounted loosely upon the arm, if desired, is straddled by the forked portion 28 of a rod or link 30, the other end of which is connected as at 31 to an arm 32 extending from the universal rock shaft 33, said shaft being actuated by means of arms, one of which is shown at 34, through a connection with the universal bar which in turn is operated by the key levers. Fastened to one side of the forked rod 30 is a forked spring 35, the forked portion 36 of which likewise straddles collar 27 and engages one of the flanges thereof, thereby forcing the forked portion of rod 30 into frictional engagement with the other flange of the collar. An adjusting screw 37 extends through the spring 35 and into an opening provided in rod 30, the function of which is to modify the tension of the spring so that the frictional engagement of the forked portion of said rod and said spring with the flanges of collar 27 may be regulated. The construction just described insures that the rocker member 4 will be oscillated at the beginning of the stroke of the universal bar upon both the forward and return stroke, but permits the universal bar to continue its stroke in either direction after the movement of said rocker member has been arrested, by reason of the frictional actuating connection provided between arm 25 and the link or rod 30. The vibratory movements of the rocker member 4 in this embodiment of my invention are arrested by a pair of oppositely disposed stops or abutments 38 and 40 respectively, which engage the free and preferably the forked end of a resilient spring arm 41 Figs. 1 and 2 which extends from said rocker member. Stop 38 is a member which is threaded into a portion of the framing of the machine so as to be adjustable therein and may be held in any desired position by means of a lock nut 42, and stop 40 is a headed stem which is threaded in an opening in member 38, and which extends entirely through as clearly shown in Fig. 2, and this stem after adjustment may be held in fixed position by means of a lock nut 43. It will, therefore, be seen that the abutments 38 and 40 may be adjusted together, and that abutment 40 may also be adjusted independently of abutment 38.

Figure 14:
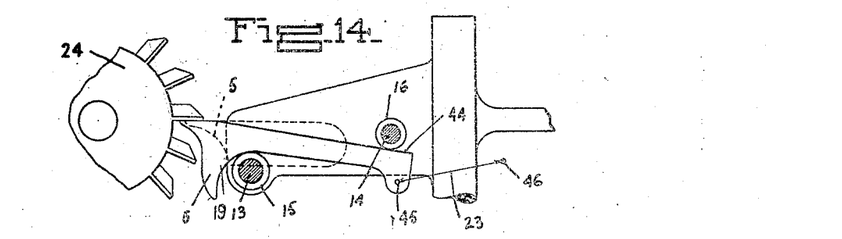
Figs. 14 and 15 show the vibratory rocker member and associated parts and a different embodiment of the loose or feed-dog in two positions and showing also a different embodiment of the means employed for arresting the movements of the vibratory dog carrier.
Figure 15:
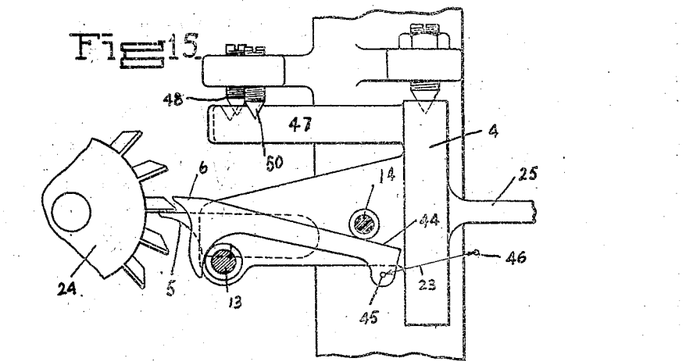
Figure 16:
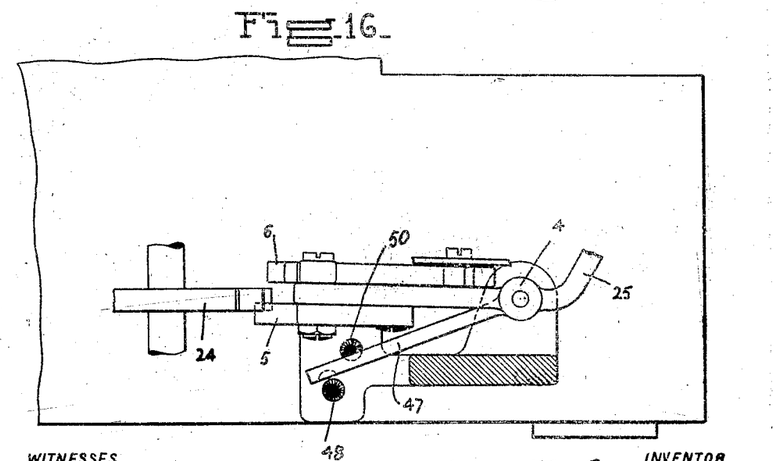
Fig. 16 is a side elevation of the mechanism illustrated in Figs. 14 and 15.
Figure 17:
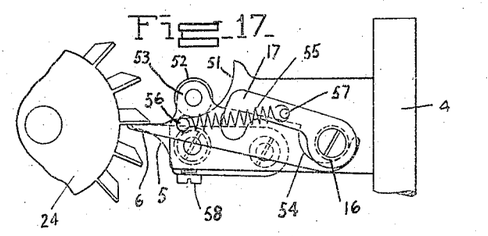
Figs. 17 and 18 show another embodiment of my invention.
Figure 18:
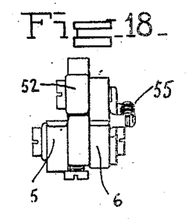

In the embodiment of the invention disclosed in Figs. 14, 15 and 16, all the parts are of similar construction, with the exception of the loose dog 6, which is not provided with the curved surface such as shown at 20 in the embodiment above described. In the present instance, this dog is provided with a flat cam surface 44 which engages the roller or bushing 16, the coil spring 23 (indicated by a straight line) being stretched between points 45 and 46. The spring 23 in this embodiment is omitted in the interest of clearness of illustration. The function of this spring, however, is precisely similar to that above described. In this embodiment of the invention the means for arresting the vibratory movements of the dog rocker comprises a rigid arm 47 which extends from the rocker member and which works between and engages the two pointed stop screws 48 and 50.

Figures 19, 20, 21, 22:
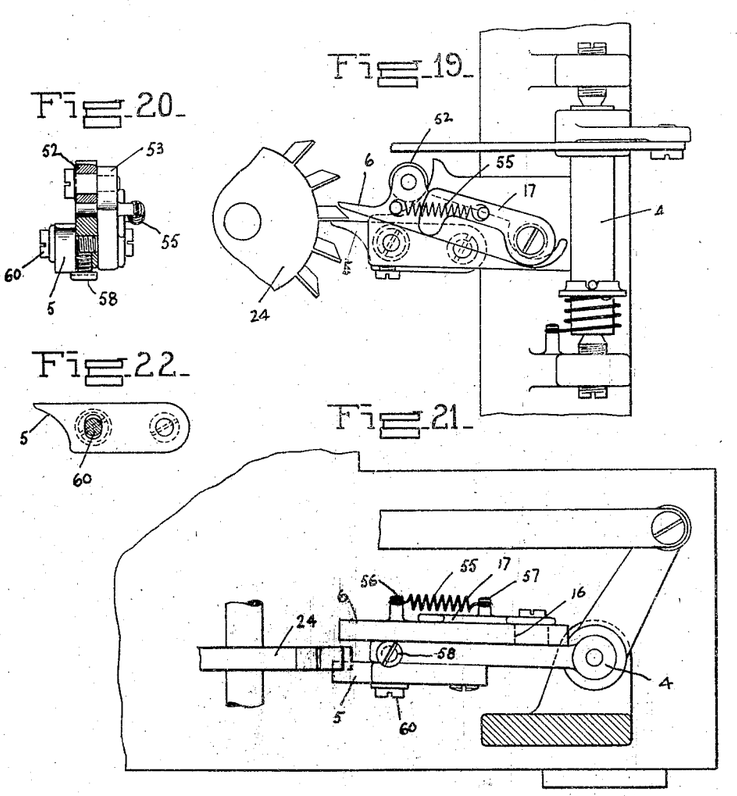
Figs. 19 and 20 show views of the parts illustrated in Figs. 17 and 18 but in another position.
Fig. 21 is a view in side elevation of the mechanism illustrated in Fig. 19.
Fig. 22 shows the fixed dog employed in the embodiments illustrated in Figs. 17 to 21 inclusive.

In the embodiment of the invention disclosed in Figs. 17 to 21 inclusive, the outer extension of the rocker member 4 is provided with a curved cam portion 51 with which a roller 52 journaled upon an ear 53 of the loose dog 6 engages. The loose dog 6 at its opposite end is provided with a cam portion 54 which hooks over and bears against the bushing 16 on the rocker. The plate 17 is placed above the loose dog 6 allowing the same to slide freely below it. The retractile spring 55 connects a pin 56 fast upon the loose dog with a similar pin 57 provided upon the plate 17 and exerts such pressure upon the loose dog as will cause the latter to follow the curve of the cam 51 and maintain the cam portion 54 in engagement with bushing 16 of post 14 whenever the loose dog is released from a tooth of the escapement wheel, as shown in Fig. 19. It will be seen that this construction is, to a large extent, a reversal of the parts of the escapement mechanism above described. In this embodiment of the invention the adjustment of the fixed dog 5 is also modified, the same being adjustable by means of an adjusting screw 58 tapped into the rocker member, the head of said screw bearing against the dog 5 which is slotted to allow the clamp screw 60 to pass through it. This clamp screw serves to clamp the dog firmly to the rocker after adjustment.

Figures 1, 3, 4:
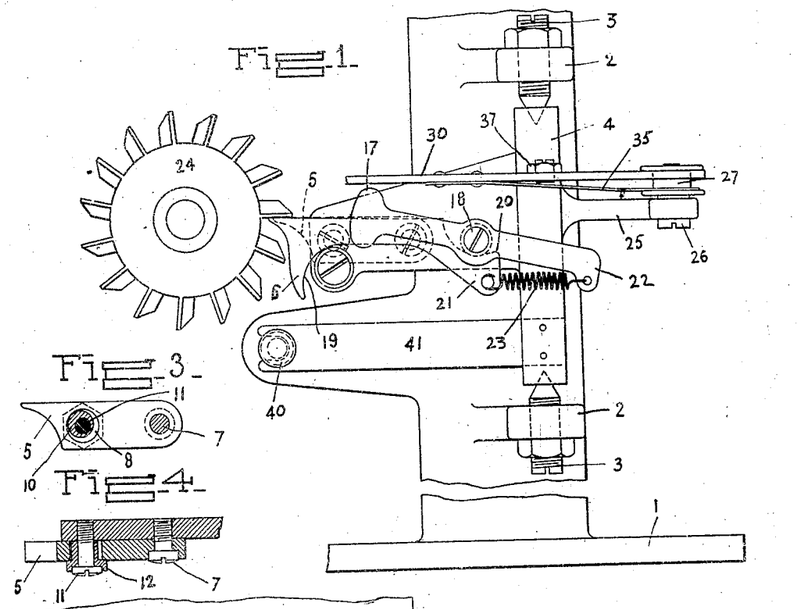
Figure 1 is a plan view of a preferred embodiment of the escapement mechanism.
Figs. 3 and 4 respectively show, in plan and section, details of the fixed or detaining-dog and the method of adjusting the same.
Figure 2:
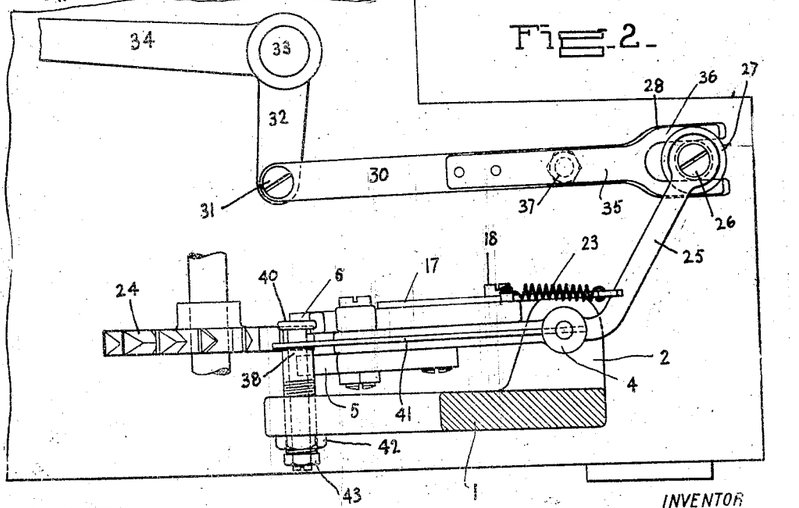
Fig. 2 is a side view thereof.
Figure 5:
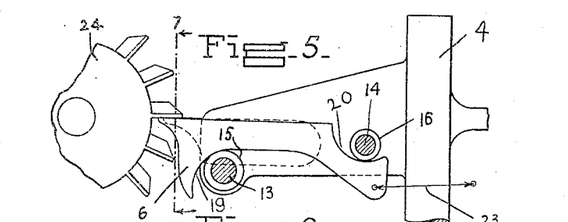
Fig. 5 is a plan view of the rocker, the escapement dog and the escapement wheel in the same position as shown in Figs. 1 and 2, certain parts being removed in order to more clearly disclose these parts.
Figure 6:
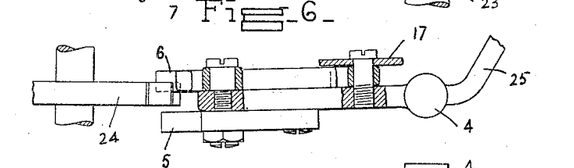
Fig. 6 is a side elevation of the parts shown in Fig. 5.
Figure 7:
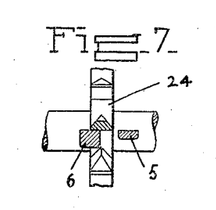
Fig. 7 is a view taken substantially on line 7—7 of Fig. 5, looking in the direction of the arrows.
Figure 8:
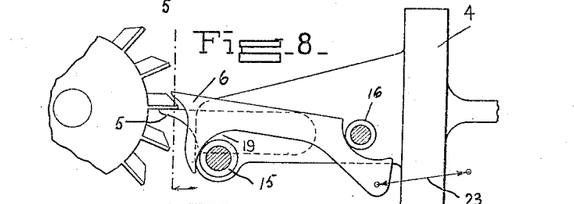
Figure 9:
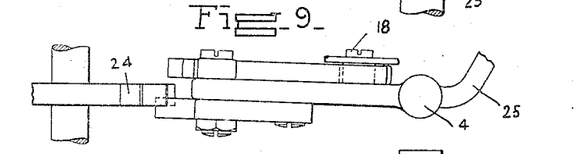
Figure 11:
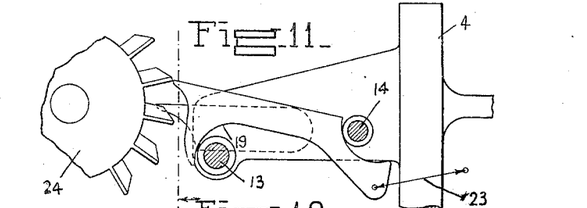
Figure 12:
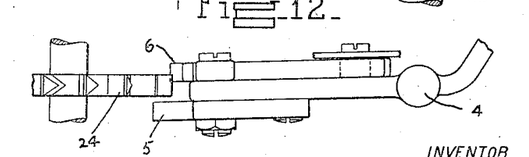

Having thus described the construction of the several embodiments of my invention, the operation thereof may now be understood. Assuming that a tooth of the escapement wheel is in engagement with the loose or floating dog 6, said dog will be pressed thereby into alinement with the fixed dog 5. In this position of the parts the loose dog has been slid outwardly and the cam surface 19 has moved upon the roller 15 of post 13, and at the same time the curve surface 20 has moved upon the bushing 16, spring 23 being extended. When, however, the vibratory rocker member 4 is vibrated through its connection with the universal rock shaft, the movable dog is disengaged from the teeth of the escapement wheel and the fixed or detaining dog engages therewith, whereupon spring 23 moves the loose dog inwardly, the outer end moving in position to engage the oncoming tooth of the escapement wheel. During the return movement of the rocker member, the loose dog is again engaged with the escapement wheel and moved thereby again into alinement with the fixed dog, the cam portions of the loose dog being so disposed with respect to the fixed abutments constituted by posts 13 and 14 that the escapement wheel will be arrested when the dogs are in alinement, and, inasmuch as such arresting operation is effected without impact or concussion of the moving parts no noise whatever will be produced, nor will any noise be produced when the loose dog is freed from the escapement wheel and is moved to its intermediate position, shown in Fig. 8, to engage the oncoming teeth of the escapement wheel. It is thus seen that the roller cam means silently arrests the movement of the floating dog in both directions. When it is desired to back space the carriage the loose dog 6 will be moved by the reverse rotation of the escapement wheel and against the tension spring 23 to such position as will enable it to clear the teeth of said escapement wheel, as shown in Fig. 11 of the drawings.

The operation of the mechanism disclosed in the other embodiments of the invention is quite similar to that last above described and should be readily understood without further description, it being evident, of course, that the floating dog, in each instance, is arrested in its intermediate position or in its position in alinement with the fixed dog without impact or concussion, and therefore noiselessly.

It will accordingly be seen that I have provided mechanism well adapted to attain, among others, all the ends and objects above pointed out in an exceedingly simple, yet efficient, manner. The embodiments of the mechanism employed for carrying out the invention are comprised by a small number of parts, and there is, therefore, little likelihood of any part thereof becoming deranged. The loose feed-dog may be readily removed from the vibratory rocker member by merely disengaging the spring by means of which it is attached to the adjustable anchor or cap, and the tension or the direction of the stress exerted by this spring may be easily changed by an adjustment of the cap. It will be obvious that the intermediate position of the feed-dog will be determined by the direction of the stress exerted by this spring. It will also be observed that, inasmuch as no impact or concussion of movable parts takes place in the escapement mechanism no noise can be produced, and yet the parts will be positively and accurately arrested in the proper positions.

The resilient stop arm provided upon the rocker member, which engages the adjustable stops and also operates to arrest the vibratory movements of said rocker member in a silent manner, and the frictional actuating connection provided between the rocker member and the universal rock shaft insures a movement of the rocker member at the beginning of each stroke of the universal rock shaft, whereby the carriage will be released at the beginning of the upward stroke of the universal bar, and will have sufficient time to complete its spacing movement before another type bar has been thrust to the printing point. A further advantage inherent in the above construction resides in the fact that all the parts may be readily adjusted and new parts substituted for worn ones without disturbing other parts of the mechanism.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention, which, as a matter of language, might be said to fall therebetween.

Having described my invention what I claim as new and desire to secure by Letters Patent, is:

1. In a typewriting machine, in combination, a member adapted to be spaced, means for effecting the spacing thereof comprising a rocker member provided with a fixed dog, a loosely mounted dog engaging said member to be spaced, having normally a swinging movement when said rocker member is actuated, and means for guiding said loosely mounted dog in its swinging movement on said rocker member adapted to gradually and silently arrest the same.

2. In a typewriting machine, the combination with the part to be spaced, of escapement mechanism therefor comprising a vibratory dog-holder, a detaining-dog fixed thereon, a swinging and endwise-movable feed-dog mounted thereon adapted to be engaged with said spaced part, and means carried by said dog-holder with which said feed dog is in constant engagement and which serves gradually and silently to arrest the same when the said dog has been engaged with the part which is adapted to be spaced and moved thereby into alinement with the detaining-dog.

3. In an escapement mechanism, the combination with the part to be spaced, of spacing means therefor comprising a vibratory dog-carrying-member having a detaining-dog thereon, a feed-dog mounted thereon and movable sidewise and endwise with respect thereto and adapted when engaged with the member to be spaced to be moved thereby into alinement with the fixed-dog, and a pair of fixed members coöperating with said feed-dog adapted to arrest its movement.

4. In an escapement mechanism, the combination with the part to be spaced, of spacing means therefor comprising a vibratory dog-carrying member having a detaining dog fixed thereon, a feed dog mounted thereon and movable sidewise and endwise with respect thereto and adapted when engaged with the member to be spaced to be moved thereby into alinement with the fixed dog, and a pair of fixed members coöperating with the periphery of said feed dog to arrest a movement of the same when it has been moved into alinement with the detaining dog.

5. In an escapement mechanism, in combination, a member to be spaced, and spacing means therefor comprising a vibratory member having a detaining-dog mounted thereon, an endwise and sidewise movable feed-dog carried thereby and adapted when engaged with the spaced member during a vibration of said vibratory member to be moved by the former into alinement with the detaining-dog, and a pair of members fixed upon said vibratory-member and so disposed with respect to the feed-dog that the movement of the latter will be arrested.

6. In an escapement mechanism, in combination, a member adapted to be spaced, a vibratory dog-carrier provided with a fixed detaining-dog and a swinging and endwise movable feed-dog, and means fixed upon said dog-carrier which coöperates with said feed-dog to arrest the latter when the same has been engaged with the spaced member and moved thereby into alinement with the detaining dog, the construction of said feed-dog and its relation to said arresting means being such that the movement of the former will be gradually and silently arrested.

7. In an escapement mechanism, in combination, a part to be spaced, a rocker member carrying a fixed dog and a loosely-mounted, sidewise and endwise movable feed-dog, and a pair of fixed abutments coöperating with said feed-dog to arrest a movement of the latter, one of said parts being provided with a cam surface for gradually arresting the motion of the feed-dog.

8. In an escapement mechanism, the combination with the part to be spaced, of spacing means therefor comprising a vibratory dog-carrier, a fixed dog mounted thereon, a loosely-mounted, swinging and endwise movable feed-dog carried thereby, fixed means carried by said dog-carrier which coöperates with said feed-dog to arrest a movement of the same, one of said parts being provided with a cam surface which coöperates with the other thereof to arrest the movement of the feed-dog when the same has been engaged with the member to be spaced and moved thereby into alinement with the fixed dog.

9. In an escapement mechanism, the combination of a vibratory dog-carrier, a loosely-mounted, endwise movable, swinging dog carried thereby, a pair of fixed members or posts coöperating with said dog to arrest a movement of the same, one of said parts being provided with a cam portion whereby the movement of the dog will be gradually arrested.

10. In an escapement mechanism, the combination of a vibratory dog-carrier, a loosely-mounted, endwise and sidewise movable feed-dog carried thereby, and provided with a cam surface, and means fixed upon said dog-carrier and coöperating with the cam surface of said feed dog gradually to arrest a movement of the latter.

11. In an escapement mechanism, the combination of a vibratory dog holder, a feed-dog loosely mounted thereon and having a plurality of cam portions, and means fixed upon said dog holder engaging one cam portion of said feed-dog and coöperating therewith gradually and silently to arrest its movement.

12. In an escapement mechanism, the combination of a vibratory dog carrier, a feed-dog loosely mounted thereon, a pair of fixed abutments located upon said dog carrier between which the dog is positioned, one of said parts being provided with a cam portion and the other of said parts engaging therewith gradually and silently to arrest a movement of said feed-dog.

13. In an escapement mechanism, the combination of a vibratory dog holder, a feed-dog loosely mounted thereon and having oppositely disposed cam portions, and a pair of fixed abutments carried by said dog holder which coöperate with said cam portions and arrest a movement of said feed-dog.

14. In an escapement mechanism, the combination with a member to be spaced, of a vibratory dog-carrier, a loosely-mounted feed dog carried by said rocker member and provided with cam portions, a pair of fixed abutments upon said rocker member with which said cam portions engage, and a spring connected with said feed-dog and adapted to position the same with respect to the spaced member.

15. In an escapement mechanism, the combination of a member adapted to be spaced, a rocker member, a feed-dog loosely mounted upon said rocker member, a pair of abutments upon said rocker member with which said feed-dog constantly engages, and a spring for positioning said feed-dog with respect to the member to be spaced, said abutments operating gradually and silently to arrest the movement of the feed-dog when the same has been engaged with the member to be spaced.

16. In an escapement mechanism, the combination of a spaced member, a rocker member provided with a fixed feed-dog, a feed-dog loosely mounted thereon and capable of occupying different positions, said feed-dog being provided with a cam portion, a pair of fixed abutments mounted upon said rocker member, one of which engages said cam portion, said abutments coöperating to arrest a movement of the feed-dog in one direction, and a spring connected with said feed-dog and tending, in conjunction with said abutments, to urge said feed-dog toward an intermediate position.

17. In an escapement mechanism, the combination of a spaced member, a rocker member provided with a fixed detaining-dog, a loosely-mounted, oscillatory feed-dog carried by said rocker member, said feed-dog being provided with a plurality of cam portions, a plurality of abutments mounted upon said rocker member, each of which engages one of said cam portions, said abutments coöperating with said cam portions to arrest the movement of said feed-dog when the same is engaged with the spaced member and moved thereby into alinement with a detaining dog, and a spring connected with said feed-dog and urging the same toward an intermediate position, said spring and said abutments coöperating with said cam portions to hold said feed-dog in such intermediate position.

18. In an escapement mechanism, the combination of a rack adapted to be connected with the part to be spaced, a rocker member provided with a fixed detaining-dog, an endwise and sidewise movable feed-dog carried by said rocker member, said feed-dog being provided with a pair of oppositely disposed cam portions one of which is located near either end thereof, a pair of abutments or posts mounted upon said rocker member, each of which engages one of the cam portions of said rocker member, said posts coöperating with said cam portions to arrest a movement of said feed-dog when the same is engaged with said rack and has been moved thereby into alinement with the fixed dog, and a spring connected with said feed-dog and coöperating with said abutments to move the feed-dog to such position as will enable it to be engaged with the succeeding tooth of said rack.

19. In an escapement for typewriting machines, the combination with a vibratory rocker member, a feed-dog loosely mounted thereon, a pair of abutments located upon said rocker member and between which said feed dog is located, one of said parts being provided with a cam portion which is adapted to be engaged by the other thereof, said abutments coöperating with said feed dog to arrest a movement of the latter in one direction, and a spring connected with said feed-dog for positioning the same with respect to the part to be spaced.

20. In an escapement mechanism for typewriters, the combination of an escapement wheel adapted to be connected with the part to be spaced, a vibratory member provided with a fixed detaining dog, a loosely mounted dog carried by said vibratory member and adapted when engaged therewith to be moved thereby into alinement with the fixed dog, a pair of abutments engaging different portions of said feed dog and adapted to arrest the same when it has been moved to such position, and a spring connected with said feed dog for positioning the same with respect to said escapement wheel when it has been disengaged therefrom.

21. In an escapement for typewriters, the combination of a vibratory dog holder carrying a fixed detaining-dog and a movable, loosely-mounted feed-dog, a pair of posts between which said feed-dog is located, a cap for confining said feed-dog between said posts, and a spring extended between said feed dog and said cap.

22. In a typewriter machine, the combination of a vibratory dog-holder provided with a fixed detaining-dog and a movable feed-dog, a pair of posts between which said feed-dog is located, a member fixed upon said dog-holder and adapted to confine said feed-dog between said posts, a spring extended between said member and said feed-dog and adapted to position the latter, and means for adjusting said last mentioned member to change the tension of said spring.

23. In an escapement for typewriting machines, the combination of a vibratory dog-holder provided with a fixed detaining-dog and a loosely-mounted, oscillatory feed-dog, a pair of abutments between which said feed-dog is located, said abutments operating to arrest a movement of said feed-dog in one direction and to permit a movement thereof in an opposite direction, and a spring connected to said feed-dog normally under tension and adapted to urge the same to movement toward an intermediate position.

24. In an escapement for typewriting machines, the combination of a vibratory dog-holder carrying a fixed detaining-dog and a loosely-mounted, movable feed-dog provided with a plurality of oppositely disposed cam portions, a plurality of abutments upon said dog holder, each of which is engaged by one of the cam portions of said feed-dog, said abutments operating to arrest said feed-dog when the same is moved in one direction but to permit a limited movement of the same in an opposite direction, and a spring connected with said feed-dog and coöperating with said abutments to hold the same in position.

25. In an escapement for typewriting machines, the combination of a vibratory dog-holder, a pair of spaced abutments, a feed-dog positioned between said abutments and movable endwise and sidewise with respect thereto, said feed-dog being provided with cam surfaces adapted to engage said abutments, a spring connected with said feed-dog and holding the cam portions thereof in constant engagement with said abutments, said abutments being adapted to arrest said feed-dog when the same is moved in one direction, said spring constantly urging the same to movement in an opposite direction and coöperating with said abutments to arrest a movement thereof in an intermediate position, and means for changing the disposition of said spring with respect to said feed-dog.

26. In an escapement for typewriters, the combination of a vibratory dog-holder carrying a fixed detaining-dog and a movable feed-dog, and provided with a pair of spaced abutments between which said feed-dog is positioned, said feed-dog being provided with a pair of oppositely disposed cam surfaces which engage with said abutments, a spring connected with said feed-dog and holding the cam portion thereof in engagement with said abutments, a cap for confining said feed-dog between said abutments, said spring being extended between the feed dog and said cap, and means whereby said cap may be adjusted to change the disposition of the spring with respect to the feed-dog.

27. In an escapement for typewriting machines, the combination of a vibratory dog-holder having a fixed detaining-dog and a loosely mounted feed-dog and being provided with a plurality of independent abutments between which said feed dog is positioned, a cap mounted upon said dog holder and holding said feed-dog between said abutments, a spring extended between said feed dog and said cap, said feed dog when detached from said spring being freely removable from between said abutments.

28. In an escapement for typewriting machines, the combination of an escapement wheel adapted to be operatively connected with the part to be spaced, a vibratory dog-holder provided with a pair of abutments, a feed-dog loosely mounted upon said dog-holder between said abutments adapted to be arrested by the latter when engaged with said escapement wheel and moved thereby in one direction, said feed-dog being movable in an opposite direction to clear the teeth of the escapement wheel when the retation thereof is reversed, and a spring connected with said feed dog tending always to urge the same toward an intermediate position.

29. In an escapement for typewriting machines, the combination of an escapement wheel adapted to be connected to the part to be spaced, a dog holder, a detaining dog fixedly mounted thereon, a feed dog loosely mounted thereon, said escapement wheel and said dog holder being relatively movable in a lateral direction whereby said dogs may be alternately engaged with said escapement wheel, a pair of spaced abutments located upon said dog holder and engaging portions of said feed dog, said abutments being adapted gradually to arrest a movement of said feed-dog when the same is engaged with said escapement wheel and moved thereby into alinement with said fixed dog, said feed-dog being adapted to be moved in an opposite direction to clear the teeth of the escapement wheel when the rotation thereof is reversed, and a spring connected with said feed-dog and normally under tension for moving said dog to an intermediate position and for holding the same in such position.

30. In an escapement for typewriting machines, in combination, a member to be spaced, a moving part, a vibratory member provided with feed dogs which coöperate with said spaced member, and a frictional connection between said moving part and said vibratory member whereby one may continue its movement after the other has been arrested.

31. In an escapement mechanism, in combination, a member to be spaced, a dog holder adapted to vibrate in a plane at right angles thereto, a fixed dog and a movable dog on said holder, and means for adjusting said fixed dog in a plane substantially parallel with said member to be spaced.

32. In an escapement for typewriting machines, the combination of a vibratory member provided with the feed-dogs and having an arm extending therefrom, a collar carried by said arm, and a forked member frictionally engaging said collar and connected with the universal bar.

33. In an escapement for typewriting machines, the combination of a vibratory dog-carrier provided with an arm, a flanged collar mounted upon said arm, a link connected with the universal bar and having a forked portion which engages said collar, and spring means for holding the forked portion of said link and one of the flanges of said collar in frictional engagement.

34. In an escapement for typewriting machines, the combination of a vibratory dog-carrier provided with an arm, a collar mounted upon said arm, a universal rock shaft, a link having a fork which straddles said collar, a spring for forcing the forked portion against one of the flanges of said collar, and an arm connecting the opposite end of said link with the universal rock shaft.

35. In an escapement for typewriting machines, the combination of a vibratory carrier for the feed dogs having an arm extending therefrom, a flanged collar mounted upon said arm, and a forked rod frictionally engaging said collar and connected with the universal rock shaft.

36. In an escapement for typewriting machines, the combination of a vibratory dog-carrier provided with an arm, a flanged wheel mounted upon said arm, an actuated rod connected with the universal rock shaft having a fork which straddles said collar, a spring secured to said link having a fork which straddles said collar, the forked portion of said spring engaging one of the flanges of said wheel and forcing the forked portion of said link against the other flange thereof whereby a frictional connection is established between said link and said arm, and means for adjusting the tension of said spring.

37. In an escapement for typewriting machines, the combination of a vibratory member which carries the feed dogs, said vibratory member being provided with an arm, a flanged wheel mounted upon the free end of said arm, a link connected with the universal rock shaft and having a forked portion which straddles said wheel and engages a flange thereof, a spring carried by said link and having a forked portion interposed between the same and the other flange of said wheel whereby a frictional engagement is effected between said wheel and said link, and means for adjusting said spring whereby the tension thereof may be varied.

38. In an escapement for typewriting machines, the combination of a vibratory dog carrier, and means for limiting the vibratory movements thereof in opposite directions comprising a resilient arm extending from said dog carrier, and oppositely disposed stops with which said arm engages.

39. In an escapement for typewriting machines, the combination of a vibratory dog-carrier, and means for limiting the vibration thereof comprising a spring arm extending from said dog-carrier, and a pair of oppositely disposed stops with which said arm engages when said dog carrier is vibrated.

40. In an escapement for typewriting machines, the combination of a vibratory dog carrier and means for limiting the vibratory movements thereof comprising a spring arm extending from said dog carrier, a pair of oppositely disposed stops between which said arm works when said dog carrier is vibrated, and means for adjusting said stops whereby the range of motion of said arm may be varied.

41. In an escapement for typewriting machines, the combination of a rocker member which carries the feed-dogs, and means for limiting the range of motion of said rocker member comprising a pair of oppositely disposed stops adapted to be engaged by a portion of said rocker member, means for adjusting said stops jointly, and means for adjusting one thereof independently of the other.

42. A stop device for moving parts of a typewriting machine comprising, in combination, an abutment threaded in a fixed portion of the machine, and an oppositely disposed abutment having a stem which is threaded in said first named abutment.

43. A stop for vibrating parts of a typewriting machine, comprising a member threaded into a fixed portion of the framing of the machine, the free end of which forms an abutment with which the moving part engages, a headed member threaded into said first-mentioned member, said head forming an abutment for the moving part, means whereby said first-mentioned member may be adjusted whereby the position of both of said abutments may be varied, means whereby said headed member may be adjusted independently of the first, and means for holding each of said members in position for adjustment.

44. In an escapement for typewriting machines, the combination of a vibratory dog-carrier having an arm extending therefrom, the universal rock-shaft, a frictional actuating connection between said arm and said rock-shaft, and resilient means for limiting the vibrations of said dog-carrier.

45. In an escapement for typewriting machines, the combination of a vibratory dog-carrier provided with a rigid actuated arm and a resilient stop arm, the universal rock shaft, a frictional connection between said universal rock shaft and the dog carrier, and means engaging said resilient stop arm for holding said rocker member stationary during portions of the movements of said universal rock shaft.

46. In an escapement for typewriting machines, the combination of a dog carrier, a fixed and a movable dog mounted thereon, an eccentric for adjusting the fixed dog with respect to the movable dog, and means for holding said dog in fixed position after adjustment.

47. In an escapement for typewriting machines, in combination, a dog-holder provided with a fixed and a movable dog, eccentric means for adjusting said fixed dog relative to said movable dog, and means for holding the same in position after adjustment.

48. In an escapement, in combination, a dog-holder, a fixed-dog mounted thereon and pivoted at its rear end to said holder, means for swinging the opposite end of said dog whereby the same may be adjusted, and means for holding the same in fixed position after adjustment.

49. In a typewriting machine, in combination, a rocker member adapted to carry fixed and movable feed-dogs, a fixed dog mounted thereon and pivotally attached to said member at its rear end, an eccentrically mounted bushing for adjusting the opposite end of said dog, and means for clamping said dog in fixed position after adjustment.

50. In an escapement for typewriting machines, in combination, a vibratory dog-carrier, a fixed-dog mounted thereon and pivotally attached thereto at its rear end, an eccentrically mounted bushing adapted to be received in an opening provided in the forward end of said dog, means for rotating said bushing whereby the position of said dog may be changed upon said dog carrier, and a clamp screw extending through said bushing for clamping said dog in position after adjustment.

51. In an escapement mechanism, the combination of a part to be spaced, a feed dog coöperating therewith, and cam means associated with said dog and adapted to arrest the movements thereof in both directions.

52. In an escapement mechanism, the combination of a part to be spaced, a movable feed dog coöperating therewith, and rolling cam means associated with said dog and adapted to arrest the movements thereof in both directions.

53. In an escapement mechanism, the combination of a part to be spaced, a movable feed dog coöperating therewith, and spring actuated rolling cam means associated with said dog and adapted to arrest the movements thereof in both directions.

54. In an escapement mechanism, the combination of a member to be spaced, a rocker member, fixed and movable dogs carried by the rocker member, and rolling cam means associated with said movable dog and adapted to arrest the movements thereof in both directions.

55. In an escapement mechanism for typewriting machines, the combination of a member to be spaced, spacing means therefor, comprising a vibratory dog holder, a movable feed dog carried thereby, one of said last-mentioned elements being provided with a concave cam path and the other with a rolling cam engaging member, and spring means for maintaining said rolling cam engaging member in engagement with said cam path.

56. In an escapement for typewriting machines, the combination of a member to be spaced, spacing means therefor comprising a vibratory dog holder, a fixed dog and a movable dog carried by said dog holder, and a cap for holding said movable dog in proper position during its movement.

57. In an escapement mechanism, the combination of a member to be spaced, a vibratory dog carrier provided with a fixed detaining dog and a movable feed dog having a cam surface, and means mounted upon said dog carrier which coöperates with said feed dog to arrest the latter when the same has been engaged with the spaced member and moved thereby into adjacency with the detaining dog, the construction of said feed dog and cam surface and their relation to said arresting means being such that the movement of the former will be gradually arrested without impact or concussion.

58. In a typewriting machine, the combination of a member to be spaced, spacing means therefor, comprising a rocker member, a fixed detaining dog mounted thereon, a movable feed dog carried thereby, said feed dog being provided with a cam portion, and positioning means for said dog mounted upon said rocker member engaging said cam portion.

59. In an escapement mechanism, the combination of a member adapted to be spaced, a vibratory dog carrier provided with a fixed detaining dog and a movable feed dog, and means independent of said feed dog, but engaging the same, adapted gradually to arrest a movement thereof in either direction.

60. In an escapement mechanism, the combination of a vibratory dog carrier, a feed dog loosely mounted thereon, means for causing said dog to move in an arc upon said dog carrier, and cam means for determining the extent of movement of said dog in either direction.

61. In the carriage escapement of a typewriting machine, the combination with an escapement rocker, of a fixed dog and a movable dog, one dog having an opening therein, and means for regulating the drop from one dog to the other comprising an eccentric part passing through said opening adapted to be rotatably adjusted to regulate the position of said dog.

62. In the carriage escapement of a typewriting machine, the combination of a rocker member, a fixed dog and a movable dog mounted thereon, one of said dogs having an opening therein, and eccentric means associated with the opening in said dog and rocker adapted to be rotatably adjusted to regulate the drop from one dog to the other.

In testimony whereof I affix my signature, in the presence of two witnesses.

JOSEPH A. RONCHETTI.

Witnesses:
ARTHUR J. B. HUDSON,
ROY J. SOULER.